US012633091B2

(12) United States Patent
Danielsson et al.

(10) Patent No.: US 12,633,091 B2
(45) Date of Patent: May 19, 2026

(54) FEATURE EXTRACTION FOR OBJECT RE-IDENTIFICATION OR OBJECT CLASSIFICATION USING A COMPOSITE IMAGE

(71) Applicant: Axis AB, Lund (SE)

(72) Inventors: Niclas Danielsson, Lund (SE); Amanda Nilsson, Lund (SE); Christian Colliander, Lund (SE); Sarah Laross, Lund (SE)

(73) Assignee: AXIS AB, Lund (SE)

( * ) Notice: Subject to any disclaimer, the term of this patent is extended or adjusted under 35 U.S.C. 154(b) by 247 days.

(21) Appl. No.: 18/734,165

(22) Filed: Jun. 5, 2024

(65) Prior Publication Data

US 2025/0005907 A1     Jan. 2, 2025

(30) Foreign Application Priority Data

Jun. 27, 2023    (EP) .................................... 23181628

(51) Int. Cl.
G06V 10/77        (2022.01)
G06T 3/4038       (2024.01)
G06V 10/82        (2022.01)

(52) U.S. Cl.
CPC ........ G06V 10/7715 (2022.01); G06T 3/4038 (2013.01); G06V 10/82 (2022.01)

(58) Field of Classification Search
CPC .. G06V 10/7715; G06V 10/82; G06V 10/803; G06T 3/4038
See application file for complete search history.

(56) References Cited

U.S. PATENT DOCUMENTS 10,430,691 B1    10/2019    Kim et al.
10,853,700 B2    12/2020    Kumar et al.
11,164,084 B1    11/2021    David et al.
(Continued)

FOREIGN PATENT DOCUMENTS

WO        2022/154806 A1    7/2022
WO        2022/225375 A1    10/2022

OTHER PUBLICATIONS

Schroff et al., "FaceNet: A Unified Embedding for Face Recognition and Clustering," Proc. CVPR (2015).
(Continued)

*Primary Examiner* — Abhishek Sarma
(74) *Attorney, Agent, or Firm* — Volpe Koenig

(57) ABSTRACT

A method for feature extraction of detected objects, comprising the steps of: receiving a plurality of images, each depicting an object detected by the object detecting application; concatenating the plurality of images into a composite image according to a grid pattern; feeding the composite image through a convolutional neural network (CNN) trained for feature extraction, wherein each convolutional layer of the CNN is configured to, while convolving input data to the convolutional layer using a convolutional filter: determine a currently convolved image of the plurality of images by determining a centre coordinate of a subset of the input data currently covered by the convolutional filter, and mapping the centre coordinate to the grid pattern; and selectively nullifying all weights of the convolutional filter that cover input data derived from any of the plurality of images not being the currently convolved image.

15 Claims, 6 Drawing Sheets

(56) References Cited

U.S. PATENT DOCUMENTS

| | | |
|---|---|---|
| 2020/0242375 A1 | 7/2020 | Ogale et al. |
| 2021/0056734 A1 | 2/2021 | Han |
| 2022/0207305 A1 | 6/2022 | Mosayyebpour Kaskari et al. |
| 2022/0327810 A1 | 10/2022 | Nagori et al. |
| 2024/0071084 A1* | 2/2024 | Bu ..................... G06N 3/0464 |

OTHER PUBLICATIONS

Liu et al., "Partial Convolution based Padding," (2018).
Wu et al., "Pedestrian-Aligned Multiscale Features Network for
Person Re-identification," 2019 Chinese Automation Congress (CAC),
Hangzhou, China, pp. 362-366, (2019).
Extended European Search Report dated Nov. 3, 2023 for European
Patent Application No. 23181628.1.
"Datasets," https://paperswithcode.com/datasets?task=image-
classification, Available at: https://web.archive.org/web/
20210620191811/https://paperswithcode.com/datasets?task=image-
classification (Jun. 20, 2021).
"Person Re-identification Datasets," http://robustsystems.coe.neu.
edu/sites/robustsystems.coe.neu.edu/files/systems/projectpages/
reiddataset.html, Available at: https://web.archive.org/web/
20180901161404/http://robustsystems.coe.neu.edu/sites/robustsystems.
coe.neu.edu/files/systems/projectpages/reiddataset.html (Sep. 1, 2018).

* cited by examiner

| 0,0 | 0,0 | 0,0 | 1,0 | 2,0 | -2,0 | -1,0 | 0,0 | 0,0 | 0,0 |
|---|---|---|---|---|---|---|---|---|---|
| 0,0 | 0,0 | 0,0 | 1,0 | 2,0 | -2,0 | -1,0 | 0,0 | 0,0 | 0,0 |
| 0,0 | 0,0 | 0,0 | 1,0 | 2,0 | -2,0 | -1,0 | 0,0 | 0,0 | 0,0 |
| 0,1 | 0,1 | 0,1 | 1,1 | 2,1 | -2,1 | -1,1 | 0,1 | 0,1 | 0,1 |
| 0,2 | 0,2 | 0,2 | 1,2 | 2,2 | -2,2 | -1,2 | 0,2 | 0,2 | 0,2 |
| 0,-2 | 0,-2 | 0,-2 | 1,-2 | 2,-2 | -2,-2 | -1,-2 | 0,-2 | 0,-2 | 0,-2 |
| 0,-1 | 0,-1 | 0,-1 | 1,-1 | 2,-1 | -2,-1 | -1,-1 | 0,-1 | 0,-1 | 0,-1 |
| 0,0 | 0,0 | 0,0 | 1,0 | 2,0 | -2,0 | -1,0 | 0,0 | 0,0 | 0,0 |
| 0,0 | 0,0 | 0,0 | 1,0 | 2,0 | -2,0 | -1,0 | 0,0 | 0,0 | 0,0 |
| 0,0 | 0,0 | 0,0 | 1,0 | 2,0 | -2,0 | -1,0 | 0,0 | 0,0 | 0,0 |

502

| w | w | w | w | 0 |
|---|---|---|---|---|
| w | w | w | w | 0 |
| w | w | w | w | 0 |
| 0 | 0 | 0 | 0 | 0 |
| 0 | 0 | 0 | 0 | 0 |

206

| 0 | w | w | w | w |
|---|---|---|---|---|
| 0 | w | w | w | w |
| 0 | w | w | w | w |
| 0 | w | w | w | w |
| 0 | w | w | w | w |

S602
Receiving a plurality of images

S604
Concatenating the plurality of images into a composite image according to a grid pattern S606
Feeding the composite image through a CNN S608
Determine a currently convolved image of the plurality of images S610
Associating the convolutional layer with a filter map S612
Selectively nullifying weights of the convolutional filter

FEATURE EXTRACTION FOR OBJECT RE-IDENTIFICATION OR OBJECT CLASSIFICATION USING A COMPOSITE IMAGE

TECHNICAL FIELD

The present invention relates to feature extraction from image data using a convolutional neural network (CNN), and in particular to methods, systems and non-transitory computer-readable storage medium for feature extraction in a CNN when the input data comprises a plurality of images that have been concatenated into a composite image according to a grid pattern.

BACKGROUND

The use of neural networks (NNs) for object detection and classification has evolved considerably over the years. The goal of these tasks is to identify and classify objects within an image or a series of images. A breakthrough in using NNs for object detection and classification came with the advent of Convolutional Neural Networks (CNNs). CNNs are a type of neural network that are especially powerful for processing grid-like data, such as images. CNNs use convolutional layers, which scan the input data with filters that can detect local patterns, such as edges or textures. These filters can be learned from data, which makes CNNs powerful and flexible for object detection and classification or object re-identification.

Hardware accelerators like Graphics Processing Units (GPUs), Tensor Processing Units (TPUs), and Field-Programmable Gate Arrays (FPGAs) are particularly advantageous for running CNNs due to their ability to handle parallel computations effectively. CNNs involve a large number of matrix and vector operations that can be computed simultaneously, which aligns well with the architecture of these accelerators. Typically, running a larger set of input data in one go may be more efficient than running a set of smaller input data through a CNN on a hardware accelerator, since the hardware accelerators capability of parallel computation may be used more effectively.

When performing object re-identification or object classification of a detected object, typically the input data to a CNN is a is a cut-out portion of the image, sometimes referred to as a crop of an image comprising the object of interest. In some cases, several objects need to be analysed, and inputting them one by one in a CNN run on a hardware accelerator may increase the time for providing the analysis necessary for all the detected objects. One solution may be to concatenate the plurality of crops into a composite image and run the composite image through the CNN. A problem with this approach may be that, unless every separate crop is padded, information may leak between the crops while convolving the composite image (or data derived therefrom) in a convolutional layer of the CNN. Using padding may result in unnecessary processing and thus increased processing time. Additionally, the quantity of padding required to keep data from different crops distinct throughout the CNN may increase with the number of convolutional layers, potentially reducing the number of crops that can be combined into a single composite image while adhering to the maximum input dimensions of the CNN.

There is thus a need for improvements in this context.

SUMMARY

In view of the above, solving or at least reducing one or several of the drawbacks discussed above would be beneficial, as set forth in the attached independent patent claims.

According to a first aspect of the present invention, there is provided a method for feature extraction for object re-identification or object classification of detected objects. The method comprises the steps of receiving a plurality of images, each image depicting an object detected by an object detecting application; concatenating the plurality of images into a composite image according to a grid pattern; and feeding the composite image through a convolutional neural network (CNN) trained for feature extraction for object re-identification or object classification.

Each convolutional layer of the CNN is configured to, while convolving input data to the convolutional layer using a convolutional filter: determine a currently convolved image of the plurality of images by determining a centre coordinate of the subset of the input data currently covered by the convolutional filter, and mapping the centre coordinate to the grid pattern; and selectively nullifying all weights of the convolutional filter that cover input data derived from any of the plurality of images not being the currently convolved image.

By the term "input data derived from any of the plurality of images" should, in the context of present specification, be understood that the input data either directly corresponds to pixel data from an image or have been calculated based on the pixel data from an image, e.g., in a previous convolutional layer of the CNN. In other words, the input data to a convolutional layer may either be:

1. direct correspondence to pixel data: The input data can directly correspond to the pixel data from an image.
2. calculation based on pixel data: The input data can also be calculated based on the pixel data from an image. This means that the input data is derived from the pixel values through e.g., calculations or transformations. This could occur, for example, in a previous convolutional layer of the CNN, where the pixel data is processed and transformed into new representations.

The techniques described herein are applied in the context of CNNs, wherein the convolutional filters are selectively applied to some regions of an input tensor (input image or feature map derived from the input image) while ignoring other regions during the convolutional filtering operation of the input tensor. Such selective application of the filters can be achieved by dynamically and selectively zeroing out or nullifying filter weights. As the convolutional filter moves over the input tensor (with a predefined stride), the weights of the convolutional filter that applies to regions that should be ignored are conditionally zeroed out. To implement such selectively nullifying of weights, the grid pattern which is used to concatenate the plurality of images (crops) is used to identify a currently convolved image of the plurality of images.

The grid pattern refers to a layout or arrangement where multiple images are organized and concatenated in a systematic grid-like structure. The grid pattern thus specifies the images' relative position to each other, as well as the size of each image. Each cell within the grid accommodates one image, maintaining consistent alignment between the plurality of images. The grid pattern may define any number of rows and columns, for example to conform to memory constraints of a hardware accelerator executing the CNN. The grid pattern thus indicates which of the plurality of images a pixel in the composite image is taken from. The grid pattern can thus be used to determine the source image from the plurality of images from which the data at any given coordinate in the input tensor is derived when it is passed into a convolutional layer. By following the grid pattern, each coordinate in the input tensor can be associated with a specific image in the plurality of images. Thus, the grid pattern provides a structured framework for mapping the coordinates of the input tensor to the plurality of images.

During the convolution operation, a convolutional filter is elementwise multiplied with the values in the overlapping region (receptive field or the receptive region) of the input tensor. These products are then summed up to produce a single value, which represents the filtered response at the centre position (also referred to as the anchor point or the reference point) of the filter. The convolutional filter is moved across the entire input tensor, applying the same convolution operation at each position, resulting in a transformed version of the input tensor, referred to as an output tensor or output data. The size of the output tensor from a convolution filter depends on the input tensor size and the stride (the step size at which the convolutional filter moves across the input tensor).

By mapping the convolutional filter to the grid pattern, specifically the centre coordinate of the subset of the input data (i.e., receptive field) currently covered by the convolutional filter, it can be determined which of the plurality of images that are currently convolved. At the first convolutional layer, the input tensor may have the same spatial dimensions as the concatenated image, and the mapping is direct. For subsequent convolutional layers, the structured change of the spatial dimensions of the output tensor compared to the input tensor results in that it may be straightforward to keep track of which data in the input data that is derived from which of the plurality of images. For example, the mapping between input data of subsequent layers and the grid pattern may be achieved by at each convolutional layer determine the size reduction factor (changes in size of the width and the height of the tensor) at the convolutional layer, i.e., determine the specific reduction factor applied during the convolution operation on the input tensor. This reduction factor could be determined by parameters such as the size of the convolutional filter and stride, as described above. The same reduction factor may then be applied to each grid cell of the grid pattern (shrinking the grid pattern by reducing the size of each grid), which may maintain consistency of the grid pattern, and align with the spatial dimension reduction of the tensor.

The currently convolved image is thus determined by looking at the centre position of the receptive field, and determining which of the plurality of images that datapoint is derived from. The weights of the convolutional filter that covers input data derived from any of the plurality of images not being the currently convolved image may thus be nullified, which in turn results in that the products of elementwise multiplications between the filter and the input data derived from any of the plurality of images not being the currently convolved image will be zero and thus not contribute to the filter response.

Advantageously, the convolutional filters of the CNN are thus selectively applied to specific regions of an input tensor while ignoring other regions, based on the grid pattern. Leakage of information between the plurality of images while convolving the input data can be avoided, without implementing a resource demanding padding solution as described above. Consequently, the capability of parallel computation at the processor running the CNN (e.g., a hardware accelerator) may be used more effectively, increasing the processing capacity per time unit when performing feature extraction for object re-identification or object classification of detected objects.

According to some examples, the method further comprises the step of associating the convolutional layer with a filter map which for each possible centre coordinate of the convolutional filter when convolving the input data is indicative of which weights of the convolutional filter that cover input data is derived from any of the plurality of images not being the currently convolved image. The step of selectively nullifying all weights may then comprise selectively nullifying weights of the convolutional filter that for the determined centre coordinate are indicated by the filter map to cover input data derived from any of the plurality of images not being the currently convolved image.

Advantageously, a flexible and efficient approach of dynamically and selectively nullifying filter weights may be achieved.

In some embodiments, the step of associating the convolutional layer with a filter map comprises associating the convolutional layer with a plurality of binary masks, each binary mask being associated with one of the plurality of images and having coordinates corresponding to the coordinates of the input data, wherein a binary mask being associated with a specific image from the plurality of images has a first binary value for all coordinates of the input data that are derived from the specific image, and a second binary value for all remaining coordinates of the input data. The step of selectively nullifying all weights comprises: selecting a binary mask from the plurality of binary mask, wherein the selected binary mask is associated with the currently convolved image; and selectively nullifying weights of the convolutional filter by masking the convolutional filter using a sub-mask of the selected binary mask corresponding to the subset of the input data currently covered by the convolutional filter.

This embodiment provides a low complexity method of selectively nullifying filter weights. The binary masks (which may be referred to as masking map, weight mask, masking array, etc.) require minimal memory usage. Moreover, the complexity of implementing the masking operation may be relatively low. The binary masks may be determined algorithmically according to the grid pattern.

In some embodiments, the filter map has coordinates corresponding to possible centre coordinates of the convolutional filter when convolving the input data, and wherein the filter map comprises, at each coordinate of the filter map, an indication of which coordinates of the convolutional filter that should have their weights nullified when the centre coordinate corresponds to that coordinate of the filter map.

Advantageously, a single filter map at each convolutional layer may be sufficient to selectively nullify filter weights at the convolutional layer. The indication may be based on the dimensions of the convolutional filter (e.g., 1D, 2D, 3D, etc.).

In some embodiments, the indication comprises a first value, i, indicating which columns of the convolutional filter that should be nullified, and a second value, j, indicating which rows of the convolutional filter that should be nullified. The filter map thus comprises two values at each coordinate of the filter map, which may provide a low complexity and memory efficient implementation of selective nullifying of weights for a 2D convolutional filter. For example, a positive value of i indicates that a rightmost i column(s) of the convolutional filter should be nullified, and wherein a negative value of i indicates that a leftmost i column(s) of the convolutional filter should be nullified, or vice versa, A positive value of j indicates that a bottom j row(s) of the convolutional filter should be nullified, and wherein a negative value of j indicates that a top j row(s) of the convolutional filter should be nullified, or vice versa.

In some examples, the CNN comprises at least a first and a second convolutional layer, wherein output from the first convolutional layer is input to the second convolutional layer, wherein the step of associating the second convolutional layer with a filter map comprises sampling the filter map associated with the first convolutional layer at least in part according to a stride of the first convolutional layer and associating the sampled filter map with the second convolutional layer. Similar to the sampling of the grid pattern as described herein, the filter map may in some cases also be sampled accordingly between convolutional layers. For example, the binary masks may advantageously be sampled between layers, since the binary patterns applicable to the second convolutional layer directly depends on the binary patterns applicable to the first convolutional layer and the dimensional reductions of the tensor resulting from the first convolutional layer.

In examples, the CNN comprises at least a first and a second convolutional layer, wherein the composite image is input to the first convolution layer, wherein output from the first convolutional layer is input to the second convolutional layer, wherein mapping the centre coordinate to the grid pattern for the second convolution layer comprises sampling the grid pattern according to a stride of the first convolutional layer and mapping the centre coordinate to the sampled grid pattern. As mentioned above, the reduction factor applied during the convolution operation on the input tensor in the first convolutional layer may be used when determining which image of the plurality of images that is currently convolved in the second convolutional layer. For example, the grid pattern may be sampled according to the reduction parameter. Such sampling may be iteratively performed per convolutional layer of the CNN.

Alternatively, an inverse function may be applied to the centre coordinate of the convolutional filter at the second convolutional layer. Put differently, in some examples, the CNN comprises at least a first and a second convolutional layer, wherein the composite image is input to the first convolution layer, wherein output from the first convolutional layer is input to the second convolutional layer, wherein mapping the centre coordinate to the grid pattern for the second convolutional layer comprises determining a centre coordinate in the input to the first convolutional layer that corresponds to the centre coordinate at least in part according to a stride of the first convolutional layer and mapping the determined centre coordinate to the grid pattern. Such transformations (mapping) of the centre coordinate may be iteratively performed per convolutional layer of the CNN.

In some embodiments, the CNN comprises one or more pooling layers, wherein a stride of the pooling layer is adapted based on a size of the input data and the grid pattern such that the pooling layer outputs one pooled feature map for each of the plurality of images. In between convolutional layers, or after the last convolutional layer, pooling operations like max pooling or average pooling can be applied to down-sample the spatial dimensions of the tensor, reducing the computational complexity and providing translational invariance. Pooling operates on small, typically non-overlapping regions of the input tensor. The size of these regions is defined by a pooling window or filter, typically of a square or rectangular shape. By adapting the stride of the pooling layer according to the size of the input data and the grid pattern, the pooling layer may output one pooled feature map for each of the plurality of images, maintaining the data separation between the plurality of input images in the output feature maps from the pooling layer.

In examples, a pooling layer outputs one pooled feature map for each of the plurality of images, wherein the method further comprises: flatten each of the pooled feature maps into a corresponding flatten vector; and separately apply a fully connected layer on each of the flattened vectors. Before passing the output of the preceding pooling layers into the fully connected layer, each of the feature maps (one per input image) are flattened into a 1-dimensional vector. This flattening process converts the multi-dimensional spatial representation into a linear format. By separately applying a fully connected layer on each of the flattened vectors, a vector of transformed values, which thus is only based on the input data from a single input image of the plurality of input images, may be outputted and passed on to subsequent layers or be used for object re-identification or object classification. For example, the output from a fully connected layer may be used as a feature vector for the input image that it has been derived from using the techniques described herein. The CNN may thus output a feature vector for each of the plurality of images.

With the techniques described herein, a concatenated image built from a plurality of separate images (crops) may be analysed by a CNN in a single run, instead of inputting each of the plurality of images separately to the CNN for analysis. Despite a possible added complexity of implementing the spatially selective convolution techniques described herein in a CNN, the number of analysed data points (pixels) per time unit may increase, for example double the number of processed pixels per millisecond compared to executing the CNN separately on each image crop. The increase of throughput may depend on the design of the processor running the CNN as well as implementation details of the spatially selective convolution technique described herein. Moreover, the methods described herein may provide a flexible approach to the feature extraction for object re-identification or object classification. For example, in some examples, the plurality of images originates from a plurality of image frames from one or more video sequences.

According to a second aspect of the invention, the above object is achieved by a non-transitory computer-readable storage medium having stored thereon instructions for implementing the method according to the first aspect when executed on a device having processing capabilities.

According to a third aspect of the invention, the above object is achieved by a system for feature extraction for object re-identification or object classification of detected objects, comprising: one or more processors; and one or more non-transitory computer-readable media storing computer executable instructions that, when executed by the one or more processors, cause the system to perform actions comprising: receiving a plurality of images, each image depicting an object detected by an object detecting application; concatenating the plurality of images into a composite image according to a grid pattern; and feeding the composite image through a convolutional neural network (CNN) trained for feature extraction for object re-identification or object classification.

Each convolutional layer of the CNN is configured to, while convolving input data to the convolutional layer using a convolutional filter: determine a currently convolved image of the plurality of images by determining a centre coordinate of a subset of the input data currently covered by the convolutional filter, and mapping the centre coordinate to the grid pattern; and selectively nullifying all weights of the convolutional filter that cover input data derived from any of the plurality of images not being the currently convolved image.

The system may be implemented in a camera. The CNN may be executed on a hardware accelerator, for example a GPU of the camera.

The second and third aspects may generally have the same features and advantages as the first aspect. It is further noted that the disclosure relates to all possible combinations of features unless explicitly stated otherwise.

Further features and advantages of the invention will become apparent from the following description of preferred embodiments of the invention, given by way of example only, which is made with reference to the accompanying drawings.

BRIEF DESCRIPTION OF THE DRAWINGS

The above, as well as additional objects, features, and advantages of the present invention, will be better understood through the following illustrative and non-limiting detailed description of embodiments of the present disclosure, with reference to the appended drawings, where the same reference numerals will be used for similar elements, wherein:

FIG. 5 shows a filter map applicable to the composite image of FIG. 1, wherein each coordinate of the filter map comprises an indication of which weights of the convolutional filter that should be nullified.

DETAILED DESCRIPTION

Figure 1:
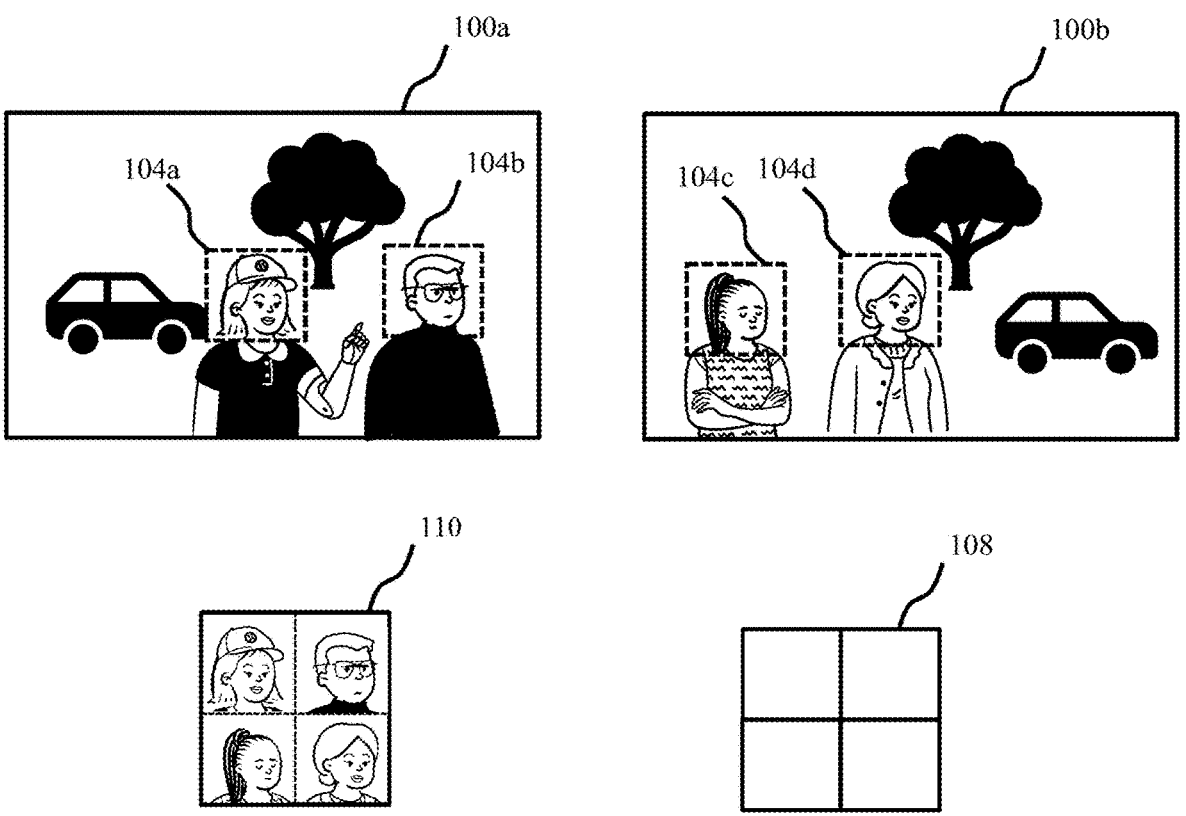
FIG. 1 shows by way of example concatenating a plurality of images into a composite image according to a grid pattern.

Object detection and classification using a convolutional neural network (CNN) can be resource intensive. For example, deep learning models, like CNNs, are typically composed of numerous layers, each containing a large number of neurons. Each neuron is a computation unit that requires resources to perform its calculations. Furthermore, the connections between neurons (weights) also need to be stored in memory. Moreover, in many applications, such as monitoring applications, real-time object detection may be crucial. Meeting these real-time requirements can be computationally intensive because it requires the CNN to process input data and make predictions very quickly. To classify an object, the CNN determines a feature vector representing the object. The feature vector is determined by activations of the neurons in one of the final layers of the network. These activations represent high-level features that the CNN has learned to extract from the image, such as the presence of particular shapes or textures. This feature vector may then be used for classification, e.g., to compute the probabilities of the different classes of objects, compute the probabilities of the different attributes of objects, etc.

A feature vector may also be used for re-identification purposes in object tracking. Object tracking aims to maintain the identity of an object across multiple frames in a video sequence or between video sequences. However, this can become challenging in certain scenarios. For instance, an object might leave the frame and then re-enter, or it might be temporarily occluded by another object. In these cases, the tracking algorithm might lose track of the object. Re-identification is the task of correctly re-assigning the same identity to the object when it reappears after being lost or occluded, and typically involves comparing the appearance of the new object to the appearances of objects that were tracked previously. This comparison can be done using a feature vector extracted using machine learning techniques.

A video sequence comprises a plurality of image frames, and each image frame may contain one or more objects for which a feature vector needs to be determined, for object classification or re-identification purposes. One way of performing the feature extraction is to cut out a subsection (a "crop") of the image for each detected object according to a bounding box of the object (as determined by an object detection component). Image data of the cropped objects may then be fed one-by-one through a CNN trained for feature extraction for object re-identification or object classification to extract a feature vector of the cropped object. However, for a video sequence including many objects, this may not be a feasible strategy, in particular if the CNN is executed on a device which has limited computational resources, such as a monitoring camera. Batch processing of the detected objects may not be supported by the employed hardware, and may thus not be possible to use to increase performance.

Another way of speeding up feature extraction for object classification or re-identification is to concatenate a plurality of images into a composite image, and thus perform feature extraction on a plurality of images at the same time. In this way, parallel computation, for example using a hardware accelerator such as Graphics Processing Units (GPUs), Tensor Processing Units (TPUs), and Field-Programmable Gate Arrays (FPGAs), may be used to perform feature extraction more effectively.

Figure 2:
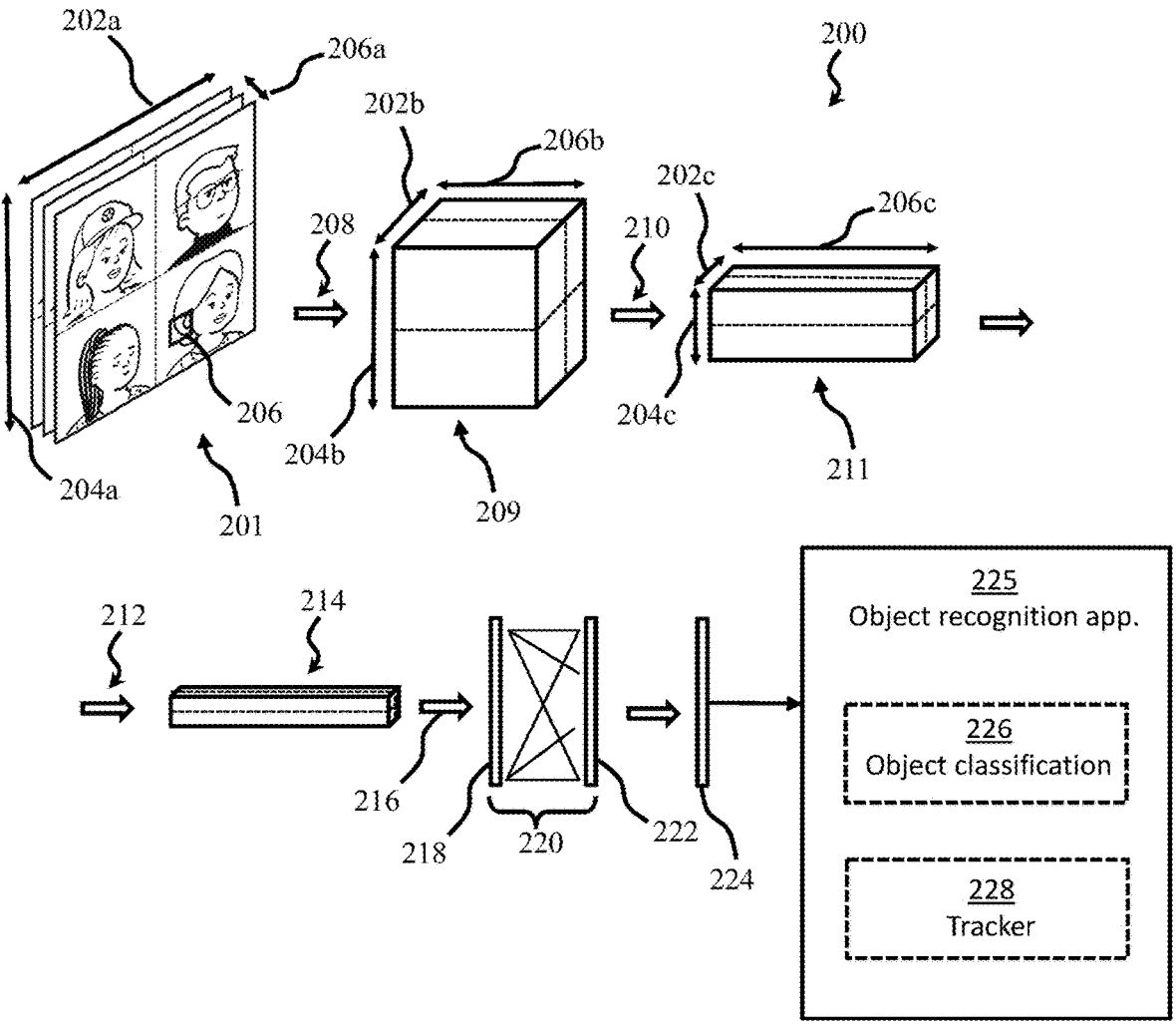
FIG. 2 shows a convolutional neural network (CNN) according to embodiments.

FIG. 1 shows by way of example two image frames 100a-b from a video sequence. A first image frame 100a comprises two objects 104a-b that have been detected by an object detection application. A second image frame 100b comprises two objects 104c-d that have been detected by the object detection application. These four objects 100a-d are cropped from their respective image frame, and the crops are concatenated into a composite image 110 according to a grid pattern 108. In FIG. 1, the composite image 110 indicate the separation of the four cropped images 104a-d using dashed lines, but these are included just for case of explanation. The composite image 110 of FIG. 1, which is used also in FIGS. 2-3, is made from a concatenation of four images 110a-d. However, in a real-life application using the techniques described herein, the number of images concatenated into a composite image may vary, for example based on memory constraints of the hardware accelerator executing the CNN used for feature extraction. In one example, the size of each of the cropped images 104a-d is 96*96 pixels. In other examples, the size is larger or smaller, depending on implementation and training data of the CNN. In some examples, one or more of the crops 104a-d need to be scaled to a certain predetermined size, for example in case the detected object is close or far away from the camera.

In some examples, a hardware accelerator used for executing the CNN is optimized to handle input data (i.e., the composite image 110) of a certain size, for example 1024*576 pixels. The optimal size may depend on the number of channels in the composite image, e.g., if the composite image is an RGB image or a grayscale image.

Depending on the above discussed requirements and limitations, the grid pattern 108 is determined, e.g., by defining a cell size of the grid, as well as a number of rows and columns in the grid. In the example of FIG. 1, the grid pattern 108 defines two rows and two columns, but as understood from the above, the number of rows and columns may be larger than 2, and the number of rows may be larger or smaller than the number of columns.

FIG. 2 shows by way of example a CNN 200 trained for feature extraction for object re-identification or object classification. Generally, a CNN consists of an input layer, one or more convolutional layers, one or more ReLU layers, one or more pooling or subsampling layers, one or more fully connected layers and an output layer.

A convolutional layer is the core building block of a CNN. The layer's parameters consist of a set of learnable filters (or kernels), which have a small receptive field, but typically extend through the full depth of the input volume. During the forward pass, each filter is convolved across the width and height of the input volume, computing the dot product between the entries of the filter and the input, producing an activation map. During training, the CNN will learn filters that activate for certain types of features in the input data. The CNN as described herein is trained for feature extraction for object re-identification or object classification. Training may be performed using labelled training data. Each training data consist of an image, for example taken from one of the many available public data sets for image classification or person re-identification (see e.g., https://paperswithcode.com/datasets?task=image-classification, or http://robustsystems.coe.neu.edu/sites/robustsystems.coc-.neu.edu/files/systems/projectpages/reid dataset.html, at the time of filing of the patent application). Labels may include the class/identity of each object as well as the object location within the training images. Training may be implemented as described in "FaceNet: A Unified Embedding for Face Recognition and Clustering" by Schroff et al. (https://arxiv.org/abs/1503.03832).

Images used to determine training data may further be captured by live monitoring cameras, and/or be synthesized using any suitable method. In some examples, object detection algorithms are run on captured images to identify suitable objects, wherein the objects are cropped from the images according to the bounding box of the object as identified by the object detection algorithm. Labelling of the cropped images may be performed manually, and/or using any suitable image analysis algorithm.

For example, the CNN may be trained using a dataset with multiple instances of each object of interest, captured under different conditions (like different viewpoints, different times, etc.). Each instance of an object may be labelled with a unique identifier for that object. The training may involve metric learning, e.g., the CNN may be trained using a metric learning approach, where the goal is to make the feature vectors of the same object closer and the feature vectors of different objects further apart in embedding space. This can be done using loss functions like contrastive loss or triplet loss, which compare the distances between pairs or triplets of objects. The metric learning may be supervised or weakly supervised. In supervised learning, the algorithm is provided with a dataset where each data point is associated with a class or label, similar to a typical classification problem. The primary objective in this scenario is to learn a distance metric that brings together data points with the same label, while pushing apart those with different labels. In weakly supervised learning, the algorithm is given a dataset with supervision available only at the tuple level, typically involving pairs, triplets, or quadruplets of data points. A classic example of weaker supervision is a collection of positive and negative pairs. In this case, the goal is to learn a distance metric that brings positive pairs close to each other and keeps negative pairs far apart.

Using the techniques described herein, the CNN may be trained using images depicting one object, and the weights of the CNN trained on single object images may be used when running a CNN on composite images as described herein. To run a CNN on composite images, the input size of the CNN needs to be adjusted to match the size of the composite image (typically a multiple of the size of the training images). Moreover, the hardware/software running the CNN needs to be adjusted to implement the process of selectively applying the convolutional filters. Further adjustments may be needed, depending on the implementation details of the CNN, such as adjusting a fully connected layer 220 as further described below, adjusting any post processing of the output tensor such that the features vectors for the plurality of images 104*a-d* are separately accessible, etc.

Consequently, the weights from the trained CNN may be employed for both the use case where each input data comprises a single object, and the use case where each input data comprises a plurality of objects in the form of a concatenated image, e.g., by selectively applying the convolutional filters as described herein.

In the example CNN 200 shown in FIG. 2, the input data 201 comprises the composite image from FIG. 1, with 3 (R, G, B) channels 206*a*. The input data has a width 202*a* and a height 204*a*, in this example, the width is 2*96=192 pixels and the height is 2*96=192 pixels. The dashed lines in the composite image indicate the separation of the individual images concatenated in the composite image, as explained above in conjunction with FIG. 1.

In the CNN of FIG. 2, the input layer is omitted. However, the input layer may generally receive raw pixel data of the composite image 201. Typically, the input layer comprises a neuron in for each single pixel value in the input data 201.

The composite image 201 is fed through the CNN 200. The data fed though the CNN may herein be referred to as the tensor. The CNN 200 comprises a first convolutional layer 208. In the example of FIG. 2, the convolutional layer 208 has a stride of two, which results in a down sampling of the tensor. This is shown in FIG. 2, in that the width 202*b* and the height 204*b* of the tensor 209 is reduced compared to before the convolutional layer 208. The height 204*b* and the width 202*b* of the tensor 209 is in this example 96. On the other hand, the number of channels 206*b* increases. When an input tensor is passed through a convolutional layer, the layer applies a series of filters (also known as kernels) to the input. Each filter is designed to detect a specific feature in the image, such as a particular colour, edge, texture, or more complex pattern. In the context of the input image being a colour image 201, the initial input tensor has three channels 206*a* corresponding to the Red, Green, and Blue (RGB) colour channels of the image. If this image is passed through a convolutional layer 208 with for example 64 filters (one such filter is indicated in FIG. 2 with the square 206), each of these filters 206 will convolve over the input image and produce an output feature map. As there are 64 filters, the result will be 64 output feature maps. These output feature maps are stacked along the depth dimension to produce the output tensor 209, which has 64 channels 206*b*.

As can be seen in FIG. 2, the tensor 209 comprises dashed lines which indicates separation of data in the tensor 209 that is derived from each of the plurality of individual images concatenated into the composite image 201. As described throughout this disclosure, for the purpose of object detection or object re-identification, it is important to keep data from the plurality of images separated during the convolving operation of the CNN 200. Techniques to accomplish this will now be described in conjunction with FIGS. 3-5.

Figure 3A:
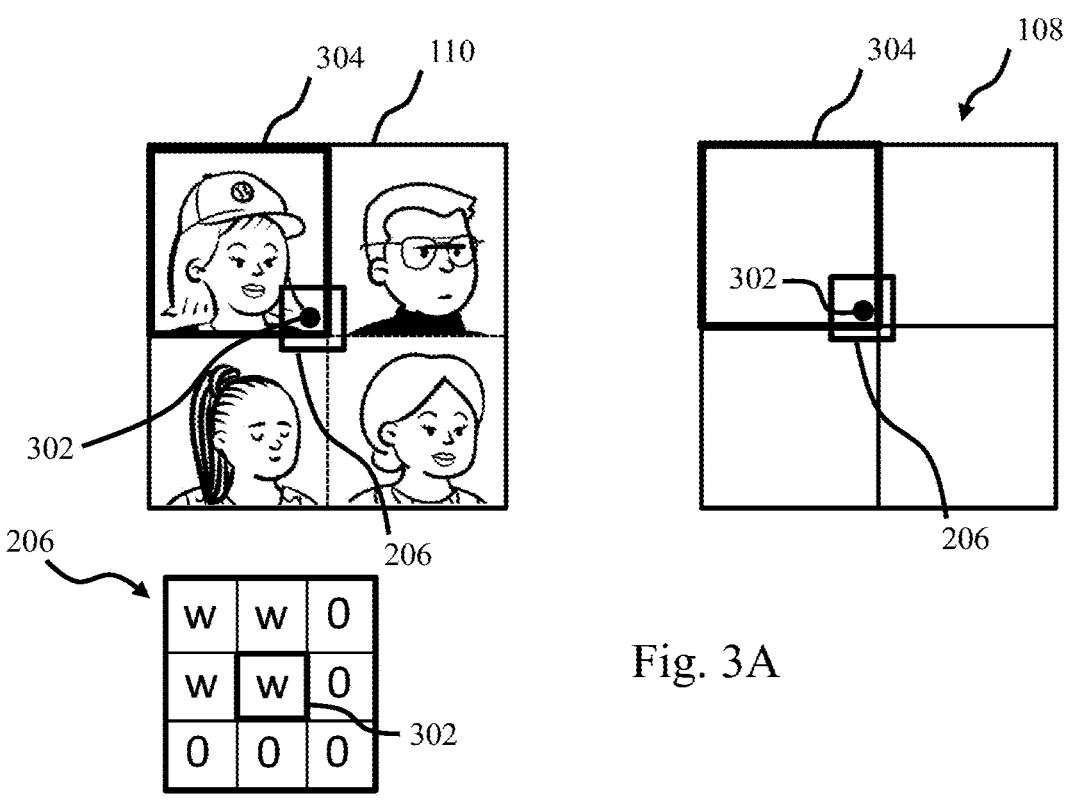
FIG. 3A shows a convolutional filter covering a subset of the composite image of FIG. 1.
Figure 3B:
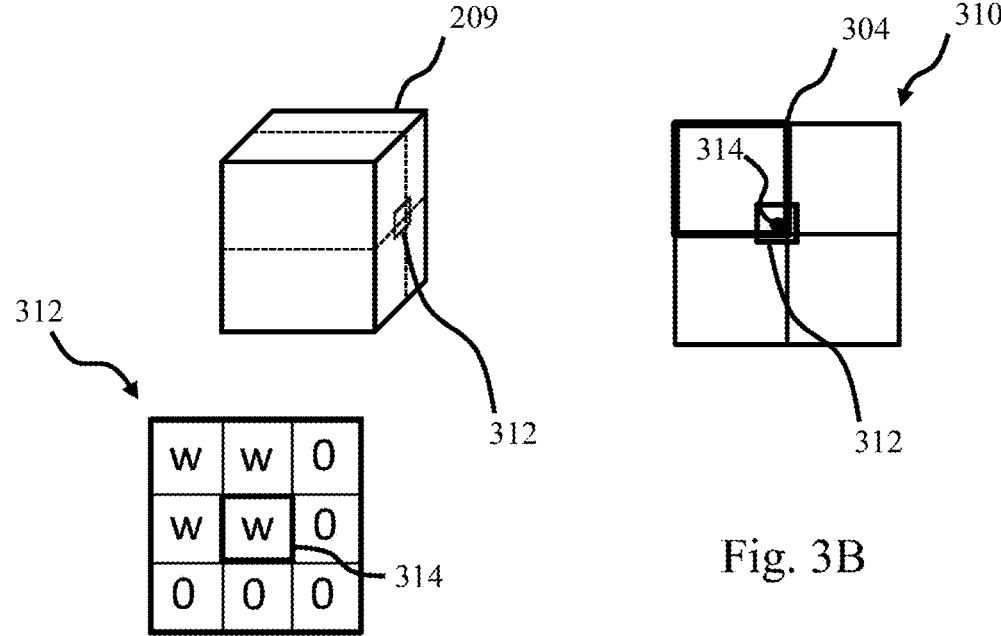
FIG. 3B shows a convolutional filter covering a subset of an output data from a convolutional layer of the CNN of FIG. 2.

As described above, a convolutional layer performs a mathematical operation called convolution to detect features in the input data. Each convolutional layer consists of multiple convolutional filters. These convolutional filters are small matrices of weights which slide over the input data. The convolution operation is the process of sliding the convolutional filter over the input tensor. At each position, the convolutional filter is elementwise multiplied with the portion of the input tensor it currently covers, and the results are summed up to obtain a single value. In the context of the input tensor being derived from a composite image comprising a plurality of images of separate objects, such a convolutional operation when performed over the boundaries of data derived from different images would result in a leakage of information between the images. In other words, performing the convolutional operation on the composite image without restriction would result in feature maps where the features at the boundaries are influenced by two adjacent images. Such feature maps would reduce the quality of the object re-identification or object classification. To mitigate this problem, the convolutional filters 206 are selectively applied to specific regions of an input image or feature map while ignoring other regions. FIGS. 3A-B schematically describe such dynamically and selectively zeroing out or nullifying of filter weights.

FIG. 3A shows a filter 206 convolving the input tensor (composite image) 110. A centre coordinate 302 of a subset of the input data 110 currently covered by the convolutional filter 206 is determined. This position corresponds to the position of output tensor to which the filtered response is applied. The centre coordinate 302 in this example is determined to be (96,96). The centre coordinate 302 is mapped to the grid pattern 108 used for concatenating the plurality of images into the composite image 110. In FIG. 3A, the convolutional filter 206 is also mapped to the grid pattern 108, for case of explanation.

The grid pattern 108 may thus be used to determine in which grid cell each pixel in the composite image 110 resides. Mapping the centre coordinate 302 to the grid pattern 108 involves determining the grid cell in which the centre coordinate 302 is located. Since each grid cell corresponds to a sub-image (i.e. one of the four cropped images 104*a-d* shown in FIG. 1) of the composite image 110, we can thereby determine the sub-image to which the centre coordinate 302 corresponds. In the example of FIG. 3A, the centre coordinate 302 maps to the top-left grid cell in the grid pattern 108, which corresponds to a currently convolved image 304 of the plurality of images.

Using this technique, a currently convolved image 304 of the plurality of images may thus be determined. By determining the currently convolved image 304, all weights of the convolutional filter 206 that cover input data derived from any of the plurality of images not being the currently convolved image may be zeroed out. This is shown in the lower part of FIG. 3A where the weights below and to the right of the centre coordinate 302 of the convolutional filter 206 are set to zero. The other weights are not set to zero, which is indicated by a "w" in FIG. 3A. It should be noted that "w" does not mean that all the weights have the same value, just that they are not nullified (set to zero). In FIG. 3A, the filter 206 is shown as a 2D filter for case of explanation, but it should be noted that a depth of the filters in a convolutional layer is typically determined by the number of channels in the input tensor to that layer as described above. For example, if the input tensor comprises three channels, the depth of the convolutional filter may typically be three.

FIG. 3B shows the same process but for the tensor at a subsequent convolutional layer in the CNN, for example the tensor 209 outputted from the first convolutional layer 208 in FIG. 2 and subjected to a convolution operation at second convolutional layer 210 in the CNN using a convolutional filter 312. For ease of explanation, the size of the convolutional filter 312 is kept the same as in FIG. 3A, but it should be noted that the size (width and height) of convolutional filters may differ between convolutional layers. The depth of the filters in a layer is typically determined by the number of channels in the input to that layer. For example, the first convolutional layer in a CNN may use filters of size 5×5 to capture larger features in the input composite image, while subsequent layers might use smaller 3×3 filters to capture smaller, more abstract features in the feature maps output by the previous layers. A centre coordinate 314 of a subset of the input data 209 currently covered by the convolutional filter 312 is determined. The centre coordinate 314 is mapped to the grid pattern 108 used for concatenating the plurality of images into the composite image 110. The mapping takes into account the size reduction factor (changes in size of the width and the height of the tensor) at all previous convolutional layers. For example, in this case, the previous convolutional layer has changed the size of the tensor from 192*192*3 to 96*96*N (N>3). This means that if the convolutional filter 312 has the size (width, height) of 3*3 and covers a subset of the tensor 209 which is located at 47-49 in the width dimension and 47-49 in the height dimension, the centre coordinate is (48,48) which is derived from the top left image in the composite image 110. In one example, the mapping of the centre coordinate to the grid pattern for the second convolution layer comprises sampling the grid pattern 108 at least in part according to a stride (which is 2 in this example) of the first convolutional layer and mapping the centre coordinate to the sampled grid pattern 310. The currently convolved image is thus the top left image 304, as indicated in FIG. 3B by the sampled grid pattern 310. Mapping of the centre coordinate 314 to the grid pattern 310 may be performed as described in conjunction with FIG. 3A, mutatis mutandis.

The mapping may in other embodiments (not shown in FIG. 3B) transform the centre coordinate (48,48) to the coordinate space of the composite image and map the transformed centre coordinate to the grid pattern 108 to determine the currently convolved image. Put differently, the mapping of the centre coordinate 314 to the grid pattern 108 for the second convolutional layer comprises determining a centre coordinate 302 in the input to the first convolutional layer that corresponds to the centre coordinate 314 at least in part according to a stride (which is 2 in this example) of the first convolutional layer 208 and mapping the determined centre coordinate 302 to the grid pattern 108. The transformed centre coordinate is thus (96,96) which is mapped, as shown in FIG. 3A, to the top left image 304 of the composite image 110 using the grid pattern 108 as described in conjunction with FIG. 3A above.

Similar to FIG. 3A, in FIG. 3B, weights below and to the right of the centre coordinate 314 of the convolutional filter 312 are set to zero, as shown in the lower part of FIG. 3B.

To determine which of the weights of the convolutional filter that should be set to zero, several approaches may be used. For example, each coordinate of the subset of the input data currently covered by the convolutional filter may be mapped to the grid pattern as described above. Weights of the convolutional filter that corresponds to coordinates in the subset that are mapped to other images than the currently convolved image may be set to zero. In some embodiments, each convolutional layer may be associated with a filter map. The filter map may, for each possible centre coordinate of the convolutional filter when convolving the input data to the convolutional layer, indicate which weights of the convolutional filter that cover input data derived from any of the plurality of images not being the currently convolved image. Selectively nullifying weights may in this example comprise selectively nullifying weights of the convolutional filter that for the determined centre coordinate are indicated by the filter map to cover input data derived from any of the plurality of images not being the currently convolved image.

Figure 4:
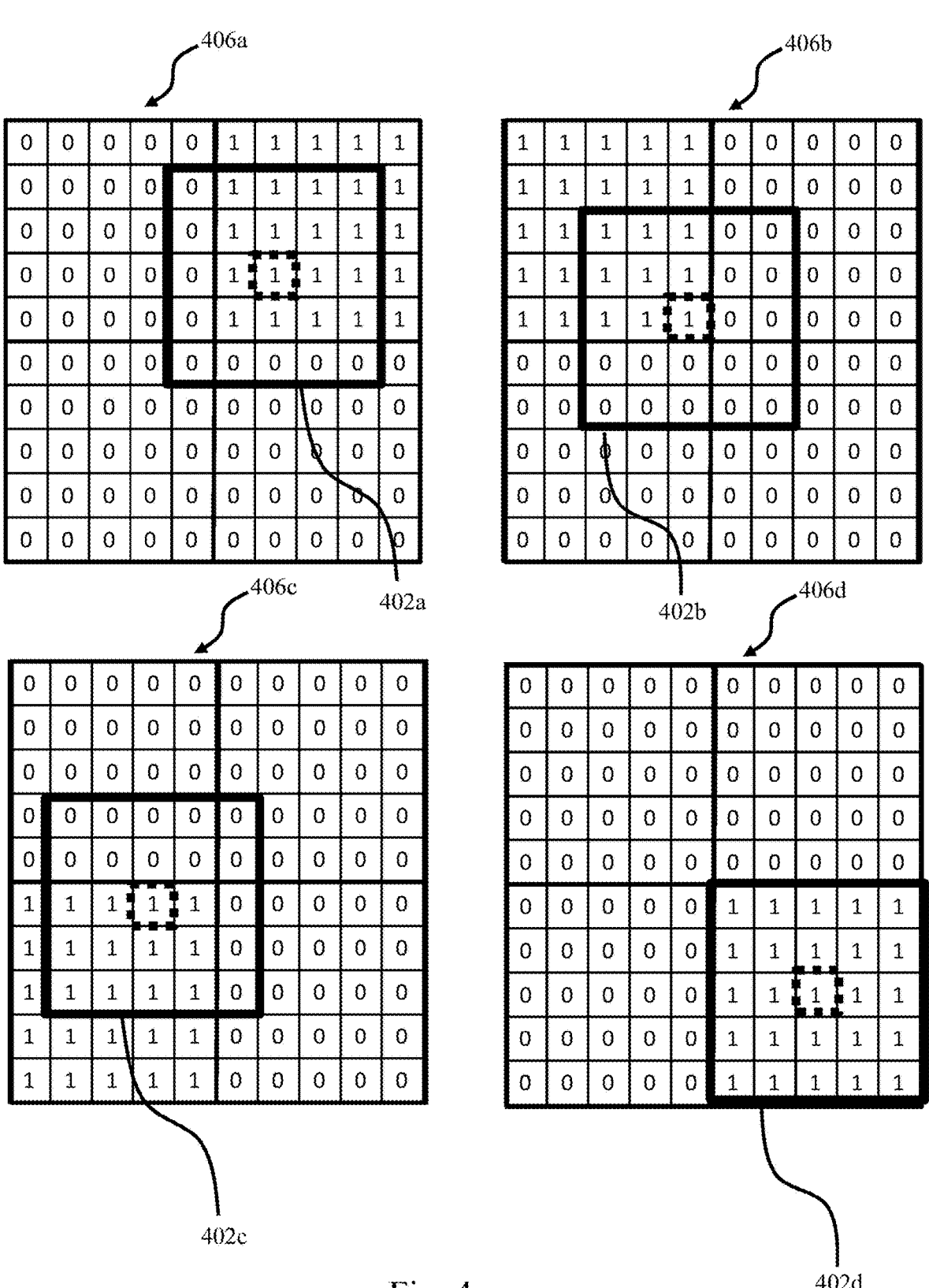
FIG. 4 shows a plurality of binary masks, each binary mask associated with a respective image of the plurality of images of FIG. 1.

FIG. 4 shows one example of implementation of such filter map. In this example, the convolutional layer is associated with a plurality of binary masks 406*a-d*. Each binary mask 406*a-d* is associated with one of the plurality of images in the composite image 110 and having coordinates corresponding to the coordinates of the input tensor to the convolutional layer. The width and height of the binary masks 406*a-d* thus correspond to the width and height of the input tensor to the convolutional layer to which the binary masks 406*a-d* are associated. In the example of FIG. 4, the number of binary masks is four, and the composite image thus comprises four images. For example, the top left binary mask 406*a* is associated with the top right image in the composite image, which is indicated by the fact that the binary mask 406*a* has a first binary value (1) for all coordinates of the input data that are derived from top right image, and a second binary value (0) for all remaining coordinates of the input data. The same goes for the other binary masks 406*b-d* which are associated with the top-left, bottom-left and bottom-right image respectively.

To nullify weights as described above, the binary mask associated with the currently convolved image is selected, and weights of the convolutional filter are selectively nullified by masking the convolutional filter using a sub-mask of the selected binary mask corresponding to the subset of the input data currently covered by the convolutional filter. In FIG. 4, by way of example, such sub-masks 402*a-d* are shown in each of the binary masks 406*a-d*. Each sub-mask 402*a-d* thus corresponds to a different subset of the input data being covered by the convolutional filter. The convolutional filter has in this example the size of 5*5. The dashed square in each of the sub-masks indicate the coordinate of the sub-mask that corresponds to the centre coordinate of the convolutional filter. As can be seen in FIG. 4, the dashed square always represents the first binary value (1) which indicates that the correct binary mask has been selected based on which subset of the input data that the convolutional filter currently covers.

To nullify weights, the convolutional filter is thus masked by the sub-mask of the selected binary mask corresponding to the subset of the input data currently covered by the convolutional filter as described above. Masking may comprise multiplying the weights of the convolutional filter with the corresponding binary values of the sub-mask. For example, for the top-left sub-mask 402*a*, weights in the left-most column and in the bottom row of the convolutional filter will be nullified, and the remaining weights will be left as is.

Advantageously, the implementation of filter maps as shown in FIG. 4 may be sampled between convolutional layers, according to the size reduction factor (changes in size of the width and the height of the tensor) at the convolutional layers. As such, associating a second convolutional layer with a filter map may comprise sampling the filter map associated with the first convolutional layer at least in part according to a stride of the first convolutional layer and associating the sampled filter map with the second convolutional layer.

FIG. 5 shows another example of an implementation 502 of the filter map discussed above. In this example, the filter map 502 has coordinates corresponding to possible centre coordinates of the convolutional filter when convolving the input data. The filter map 502 further comprises, at each coordinate of the filter map, an indication of which coordinates of the convolutional filter that should have their weights nullified when the centre coordinate corresponds to that coordinate of the filter map. For example, as shown in FIG. 5, the indication may comprise a first value i, indicating which columns of the convolutional filter that should be nullified, and a second value j, indicating which rows of the convolutional filter that should be nullified. In FIG. 5, a positive value of i indicates that a rightmost i column(s) of the convolutional filter should be nullified, and a negative value of i indicates that a leftmost i column(s) of the convolutional filter should be nullified. Similarly, a positive value of j indicates that a bottom j row(s) of the convolutional filter should be nullified, and a negative value of j indicates that a top j row(s) of the convolutional filter should be nullified. In FIG. 5, two examples of convolutional filters 206 are shown, for two different centre coordinates of the convolutional filter. In the left example, the applicable coordinate in the filter map 502 shows the values 1,2 which means that the rightmost column of the convolutional filter 206 should be nullified and the bottom two rows of the convolutional filter 206 should be nullified. The other weights are not set to zero, which is indicated by a "w" in FIG. 5. Similarly, as described above in conjunction with FIGS. 3A-B, it should be noted that "w" does not mean that all the weights are the same, just that they are not nullified (set to zero). In the right example, the applicable coordinate in the filter map 502 shows the values −1,0 which means that the left most column of the convolutional filter 206 should be nullified.

Returning to FIG. 2. The output tensor 209 is fed into a second convolutional layer 210. In the example of FIG. 2, the convolutional layer 210 has a stride of two, which results in a down-sampling of the tensor. This is shown in FIG. 2, in that the width 202*c* and the height 204*c* of the output tensor 211 is reduced compared to before the convolutional layer 210. The height 204*c* and the width 202*c* of the tensor 211 is in this example 48. On the other hand, the number of channels 206*c* increases as described above due to the number of applied convolutional filters in the second convolutional layer 210.

The next stage of the CNN 200 is a pooling layer 212. The pooling layer 212 may comprise average pooling, max pooling or any other suitable pooling. In examples, a stride of the pooling layer is adapted based on a size of the input data and the grid pattern such that the pooling layer 212 outputs one pooled feature map 214 for each of the plurality of images. For example, in case the stride is set to 24, the pooling layer 212 outputs one pooled 1D feature map (vector) 214 for each of the plurality of images. In case the stride is set to 12, the pooling layer 212 outputs one pooled 2D feature map 214 (matrix with height=2 and width=2) for each of the plurality of images.

The next stage of the CNN 200 is a fully connected layer 220. As described above, the pooling layer 212 outputs one pooled feature map for each of the plurality of images. Each of the pooled feature maps is then flattened 216 into a corresponding flattened vector 218.

In the example above, when the stride is 24, the flattening process comprises taking the pooled 1D feature map and using that as a flattened vector 218.

For the example when the stride is 12 each vector from the pooled 2D feature map is read out one-by-one and stacked on top of each other to form 1-D flattened vector 218. In this example, forming a flattened vector 218 comprises reading out 4 vectors (height=2 and width=2) and stacking them on top of each other.

A fully connected layer 220 may then be applied on each of the flattened vectors, using weights 222. In FIG. 2, for ease of description, only one of the flattened vectors 218 are shown. An output 224 from the fully connected layer 220 may be used as a feature vector for the input image that it was derived from using the techniques described herein. In FIG. 2, for case of description, only one of the feature vectors 224 are shown. The feature vector may subsequently be used by an object recognition application 225, for example by an object classification component 226 for classification purposes and/or by a tracker 228, e.g., for re-identification purposes.

Figure 6:
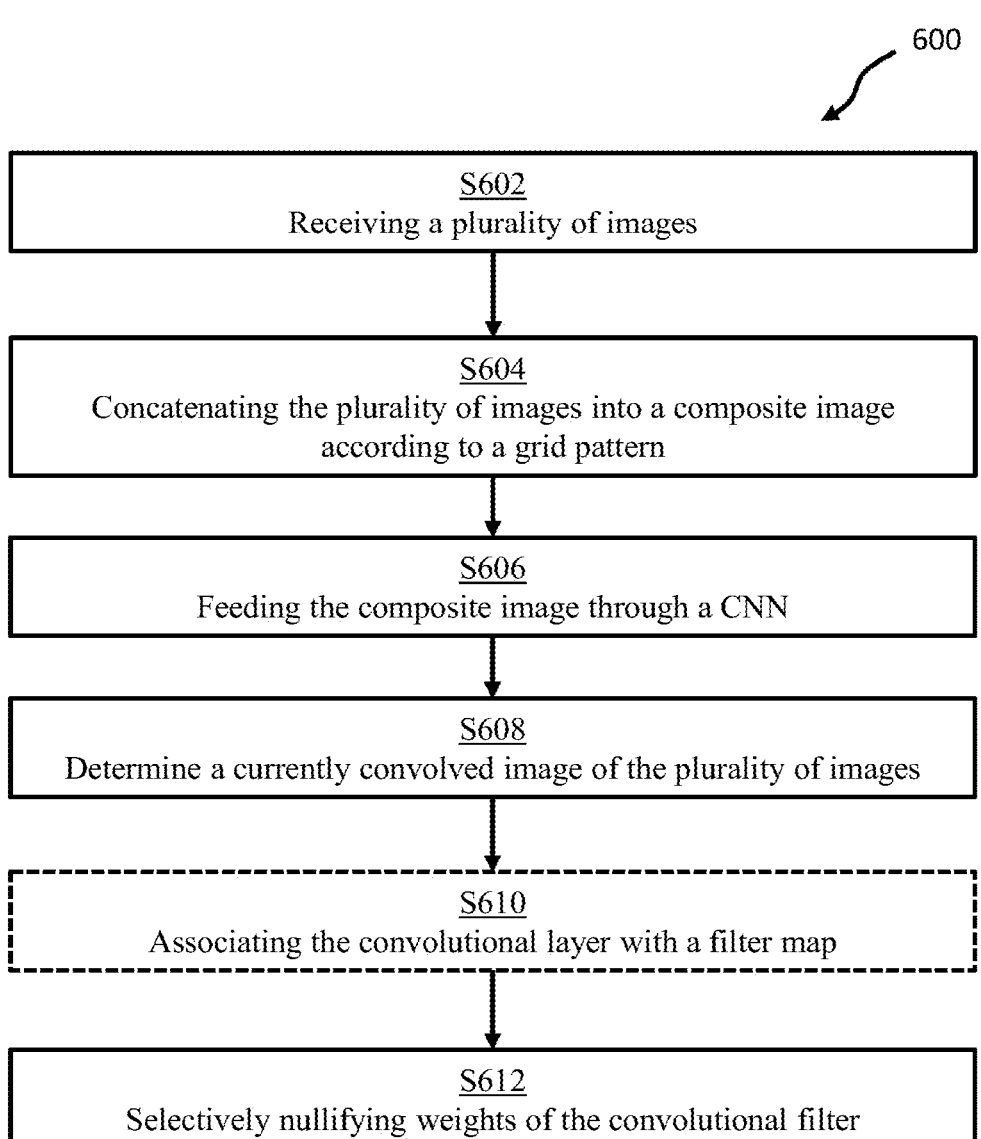
FIG. 6 shows a flow chart of a method for feature extraction for object re-identification or object classification of detected objects according to embodiments.

A CNN (for example the CNN 200 of FIG. 2) employing the techniques described herein may be implemented by a system for feature extraction for object re-identification or object classification of detected objects. The system may comprise one or more processors, for example including a hardware accelerator as described above. In some embodiments, some or all of the computations performed by the CNN for extracting and interpreting features in input data (the composite image) may be mapped to specialized hardware such as the above-mentioned hardware accelerators. The system may further comprise general purpose processors (CPU), e.g., instructing the hardware accelerators, and handling the feature vectors outputted from the CNN. Generally, the system may comprise one or more non-transitory computer-readable media storing computer executable instructions that, when executed by the one or more processors, cause the system to perform actions as described in FIG. 6.

The actions comprise receiving S602 a plurality of images, each image depicting an object detected by an object detecting application. An "object detection application" is an application that, based on input (usually images or videos), provides information about the locations of objects within the input. Any suitable object detection application may be used, for example an application implementing Histogram of Oriented Gradients (HOG), Scale-Invariant Feature Transform (SIFT), Speeded-Up Robust Features (SURF) or any known neural network implementation such as Faster R-CNN (Region-based Convolutional Neural Networks) or RetinaNet.

The actions further comprise concatenating S604 the plurality of images into a composite image according to a grid pattern. The actions further comprise feeding S606 the composite image through a CNN trained for object re-identification or object classification.

Each convolutional layer of the CNN is configured to, while convolving input data to the convolutional layer using a convolutional filter, determine S608 a currently convolved image of the plurality of images by determining a centre coordinate of a subset of the input data currently covered by the convolutional filter, and mapping the centre coordinate to the grid pattern.

The actions may further comprise associating S610 the convolutional layer with a filter map which for each possible centre coordinate of the convolutional filter when convolving the input data is indicative of which weights of the convolutional filter that cover input data derived from any of the plurality of images not being the currently convolved image.

Each convolutional layer of the CNN is further configured to, while convolving input data to the convolutional layer using a convolutional filter, selectively S612 nullifying all weights of the convolutional filter that cover input data derived from any of the plurality of images not being the currently convolved image. In some embodiments, the selective nullifying of weights comprises selectively nullifying weights of the convolutional filter that for the determined centre coordinate are indicated by the filter map to cover input data derived from any of the plurality of images not being the currently convolved image.

The system may comprise one or more devices. In some embodiments, different steps or parts of the techniques described herein may be implemented in different devices. For example, the steps of receiving S602 a plurality of images, and concatenating S604 the plurality of images into a composite image according to a grid pattern may be performed in one device while executing the CNN as described herein may be performed in another device. In some embodiments, the system is implemented in a monitoring camera. The monitoring camera may in embodiments capture a video sequence as described in conjunction with FIG. 1 above and perform the object detection to identify the plurality of images of objects for which feature vectors should be determined.

The above embodiments are to be understood as illustrative examples of the invention. Further embodiments of the invention are envisaged. For example, the system may be coupled to an external data storage from which the plurality of images are retrieved. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for feature extraction for object re-identification or object classification of detected objects, comprising the steps of:

from one or more image frames, determining a plurality of images, each image depicting an object detected by an object detecting application, each image corresponding to a cut-out from an image frame among the one or more image frames, the cut-out corresponding to the detected object;

concatenating the plurality of images into a composite image according to a 2D grid pattern wherein each cell of the grid pattern accommodates one image of the plurality of images;

feeding the composite image through a convolutional neural network, (CNN), trained for feature extraction for object re-identification or object classification, wherein each convolutional layer of the CNN is configured to, while convolving input data to the convolutional layer using a convolutional filter:

determine a currently convolved image of the plurality of images by determining a centre coordinate of a subset of the input data, the subset of input data currently covered by the convolutional filter, wherein the centre coordinate corresponds to an anchor point of the convolutional filter, and mapping the centre coordinate to the grid pattern; and selectively nullifying all weights of the convolutional filter that cover input data derived from any of the plurality of images not being the currently convolved image.

2. The method of claim 1, further comprising the step of:

associating the convolutional layer with a filter map which for each possible centre coordinate of the convolutional filter when convolving the input data is indicative of which weights of the convolutional filter that cover input data derived from any of the plurality of images not being the currently convolved image, wherein the step of selectively nullifying all weights comprises:

selectively nullifying weights of the convolutional filter that for the determined centre coordinate are indicated by the filter map to cover input data derived from any of the plurality of images not being the currently convolved image.

3. The method of claim 2, wherein the step of associating the convolutional layer with a filter map comprises:

associating the convolutional layer with a plurality of binary masks, each binary mask being associated with one of the plurality of images and having coordinates corresponding to the coordinates of the input data, wherein a binary mask being associated with a specific image from the plurality of images has a first binary value for all coordinates of the input data that are derived from the specific image, and a second binary value for all remaining coordinates of the input data;

wherein the step of selectively nullifying all weights comprises:

selecting a binary mask from the plurality of binary masks, wherein the selected binary mask is associated with the currently convolved image; and selectively nullifying weights of the convolutional filter by masking the convolutional filter using a sub-mask of the selected binary mask corresponding to the subset of the input data currently covered by the convolutional filter.

4. The method of claim 3, wherein the filter map has coordinates corresponding to possible centre coordinates of the convolutional filter when convolving the input data, and wherein the filter map comprises, at each coordinate of the filter map, an indication of which coordinates of the convolutional filter that should have their weights nullified when the centre coordinate corresponds to that coordinate of the filter map.

5. The method of claim 2, wherein the indication comprises a first value, i, indicating which columns of the convolutional filter that should be nullified, and a second value, j, indicating which rows of the convolutional filter that should be nullified.

6. The method of claim 5, wherein a positive value of i indicates that a rightmost i column(s) of the convolutional filter should be nullified, and wherein a negative value of i indicates that a leftmost i column(s) of the convolutional filter should be nullified, or vice versa; and wherein a positive value of j indicates that a bottom j row(s) of the convolutional filter should be nullified, and wherein a negative value of j indicates that a top j row(s) of the convolutional filter should be nullified, or vice versa.

7. The method of claim 2, wherein the CNN comprises at least a first and a second convolutional layer, wherein output from the first convolutional layer is input to the second convolutional layer, wherein the step of associating the second convolutional layer with a filter map comprises sampling the filter map associated with the first convolutional layer at least in part according to a stride of the first convolutional layer and associating the sampled filter map with the second convolutional layer.

8. The method of claim 1, wherein the CNN comprises at least a first and a second convolutional layer, wherein the composite image is input to the first convolution layer, wherein output from the first convolutional layer is input to the second convolutional layer, wherein mapping the centre coordinate to the grid pattern for the second convolution layer comprises sampling the grid pattern at least in part according to a stride of the first convolutional layer and mapping the centre coordinate to the sampled grid pattern.

9. The method of claim 1, wherein the CNN comprises at least a first and a second convolutional layer, wherein the composite image is input to the first convolution layer, wherein output from the first convolutional layer is input to the second convolutional layer, wherein mapping the centre coordinate to the grid pattern for the second convolutional layer comprises determining a centre coordinate in the input to the first convolutional layer that corresponds to the centre coordinate at least in part according to a stride of the first convolutional layer and mapping the determined centre coordinate to the grid pattern.

10. The method of claim 1, wherein the CNN comprises one or more pooling layers, wherein a stride of the pooling layer is adapted based on a size of the input data and the grid pattern such that the pooling layer outputs one pooled feature map for each of the plurality of images.

11. The method of claim 1, wherein a pooling layer outputs one pooled feature map for each of the plurality of images, wherein the method further comprises:

flatten each of the pooled feature maps into a corresponding flattened vector; and separately apply a fully connected layer on each of the flattened vectors.

12. The method of claim 1, wherein the plurality of images originates from a plurality of image frames from one or more video sequences.

13. The method of claim 1, further comprising the step of:

outputting, by the CNN, a feature vector for each of the plurality of images.

14. A non-transitory computer-readable storage medium having stored thereon instructions for implementing a method, when executed on a device having processing capabilities, the method for feature extraction for object re-identification or object classification of detected objects, comprising the steps of:

from one or more image frames, determining a plurality of images, each image depicting an object detected by an object detecting application, each image corresponding to a cut-out from an image frame among the one or more image frames, the cut-out corresponding to the detected object;

concatenating the plurality of images into a composite image according to a 2D grid pattern wherein each cell of the grid pattern accommodates one image of the plurality of images;

feeding the composite image through a convolutional neural network, (CNN), trained for feature extraction for object re-identification or object classification, wherein each convolutional layer of the CNN is configured to, while convolving input data to the convolutional layer using a convolutional filter:

determine a currently convolved image of the plurality of images by determining a centre coordinate of a subset of the input data, the subset of input data currently covered by the convolutional filter, wherein the centre coordinate corresponds to an anchor point of the convolutional filter, and mapping the centre coordinate to the grid pattern; and selectively nullifying all weights of the convolutional filter that cover input data derived from any of the plurality of images not being the currently convolved image.

15. A system for feature extraction for object re-identification or object classification of detected objects, comprising:

one or more processors; and one or more non-transitory computer-readable media storing computer executable instructions that, when executed by the one or more processors, cause the

20 system to perform actions comprising:

from one or more image frames, determining a plurality of images, each image depicting an object detected by an object detecting application, each image corresponding to a cut-out from an image frame among the one or more image frames, the cut-out corresponding to the detected object;

concatenating the plurality of images into a composite image according to a 2D grid pattern, wherein each cell of the 2D grid pattern accommodates one image of the plurality of images;

feeding the composite image through a convolutional neural network, (CNN), trained for feature extraction for object re-identification or object classification, wherein each convolutional layer of the CNN is configured to, while convolving input data to the convolutional layer using a convolutional filter:

determine a currently convolved image of the plurality of images by determining a centre coordinate of a subset of the input data, the subset of data currently covered by the convolutional filter, wherein the centre coordinate corresponds to an anchor point of the convolutional filter, and mapping the centre coordinate to the grid pattern; and selectively nullifying all weights of the convolutional filter that cover input data derived from any of the plurality of images not being the currently convolved image.

* * * * *